US008462854B2

(12) United States Patent
Henocq et al.

(10) Patent No.: US 8,462,854 B2
(45) Date of Patent: Jun. 11, 2013

(54) METHOD AND DEVICE FOR RECONSTRUCTING A SEQUENCE OF VIDEO DATA AFTER TRANSMISSION OVER A NETWORK

(75) Inventors: Xavier Henocq, Melesse (FR); Patrice Onno, Rennes (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/838,637

(22) Filed: Jul. 19, 2010

(65) Prior Publication Data

US 2011/0013701 A1 Jan. 20, 2011

(30) Foreign Application Priority Data

Jul. 17, 2009 (EP) .................................. 09305686

(51) Int. Cl.
*H04N 7/12* (2006.01)
*H04N 11/02* (2006.01)
*H04N 11/04* (2006.01)

(52) U.S. Cl.
USPC ............. 375/240.25; 375/240.26; 375/240.27

(58) Field of Classification Search
None
See application file for complete search history.

(56) References Cited

U.S. PATENT DOCUMENTS

| | | | |
|---|---|---|---|
| 6,501,860 B1 | 12/2002 | Charrier et al. ............... 382/240 |
| 6,683,988 B1 * | 1/2004 | Fukunaga et al. ............ 382/236 |
| 6,891,895 B1 | 5/2005 | Onno et al. .................... 375/260 |
| 7,113,643 B2 | 9/2006 | Le Leannec et al. ......... 382/235 |
| 7,190,838 B2 | 3/2007 | Le Leannec et al. ......... 382/233 |
| 7,212,678 B2 | 5/2007 | Brown et a .................... 382/240 |
| 7,215,819 B2 | 5/2007 | Onno et al. .................... 382/240 |
| 7,260,264 B2 | 8/2007 | Guillou et al. ................ 382/232 |
| 7,281,033 B2 | 10/2007 | Le Leannec et al. ......... 709/217 |
| 7,382,923 B2 | 6/2008 | Onno ............................ 382/233 |
| 7,453,937 B2 | 11/2008 | Henocq et al. ........... 375/240.03 |
| 7,466,865 B2 | 12/2008 | Henocq et al. ................ 382/239 |
| 7,499,546 B2 | 3/2009 | Donescu et al. .............. 380/217 |
| 7,571,316 B2 | 8/2009 | Onno et al. .................... 713/160 |
| 7,580,578 B1 | 8/2009 | Onno et al. .................... 382/232 |
| 7,746,332 B2 | 6/2010 | Le Leannec et al. ......... 345/204 |
| 2004/0068587 A1 | 4/2004 | Le Leannec et al. ......... 709/247 |
| 2006/0188025 A1* | 8/2006 | Hannuksela ............. 375/240.27 |
| 2007/0019721 A1 | 1/2007 | Le Leannec et al. ...... 375/240.1 |
| 2007/0127576 A1 | 6/2007 | Henocq et al. ........... 375/240.16 |
| 2007/0195880 A1 | 8/2007 | Henocq et al. ........... 375/240.13 |

(Continued)

OTHER PUBLICATIONS

Wang, Yao, et al., "Error Control and Concealment for Video Communication: A Review", Proceedings of the IEEE, vol. 86, No. 5, May 1, 1998, pp. 974-997.

(Continued)

*Primary Examiner* — Joseph Ustaris
*Assistant Examiner* — Kevin McInnish
(74) *Attorney, Agent, or Firm* — Fitzpatrick, Cella, Harper & Scinto

(57) ABSTRACT

A method of reconstructing a sequence of video data in a receiving device after the video sequence has been transmitted in encoded form over a network, the encoded video sequence comprising containers of encoded video data, wherein the method includes the following steps:
determining (809) containers of encoded video data affected by data losses during their transmission over the network,
determining (813) the time that would be necessary for decoding said containers of encoded video data affected by data losses if they had not been affected by data losses,
allocating (819, 820, 821) the time thus determined to reconstructing video data of the sequence.

16 Claims, 10 Drawing Sheets

U.S. PATENT DOCUMENTS

| | | | |
|---|---|---|---|
| 2007/0223033 A1 | 9/2007 | Onno et al. | 358/1.15 |
| 2007/0286508 A1 | 12/2007 | Le Leannec et al. | 382/240 |
| 2008/0025399 A1 | 1/2008 | Le Leannec et al. | 375/240.16 |
| 2008/0075170 A1 | 3/2008 | Henocq et al. | 375/240.16 |
| 2008/0095231 A1 | 4/2008 | Onno et al. | 375/240.12 |
| 2008/0130736 A1 | 6/2008 | Onno et al. | 375/240.01 |
| 2008/0131011 A1 | 6/2008 | Le Leannec et al. | 382/238 |
| 2008/0144725 A1 | 6/2008 | Henocq et al. | 375/240.27 |
| 2008/0232478 A1 | 9/2008 | Teng et al. | 375/240.27 |
| 2009/0016433 A1 | 1/2009 | Henocq et al. | 375/240.01 |
| 2009/0122865 A1 | 5/2009 | Henocq et al. | 375/240.12 |
| 2009/0213940 A1* | 8/2009 | Steinbach et al. | 375/240.27 |
| 2009/0278956 A1 | 11/2009 | Le Leannec et al. | 348/222.1 |
| 2009/0290648 A1 | 11/2009 | Onno et al. | 375/240.27 |
| 2009/0310674 A1 | 12/2009 | Le Leannec et al. | 375/240.12 |
| 2009/0323826 A1* | 12/2009 | Wu et al. | 375/240.27 |
| 2010/0142622 A1 | 6/2010 | Le Leannec et al. | 375/240.16 |

OTHER PUBLICATIONS

Lehtoranta, O., et al., "Comparison of Video Protection Methods for Wireless Networks", Signal Processing: Image Communication, vol. 18, No. 10, Nov. 1, 2003, pp. 861-877.

Bucciol, P., et al., "Cross-Layer Perceptual ARQ for H.264 Video Streaming over 802.11 Wireless Networks", Global Communications Conference (Globecom 2004), Proceedings of the IEEE Communications Society, vol. 5, Nov. 29, 2004, pp. 3027-3031.

* cited by examiner

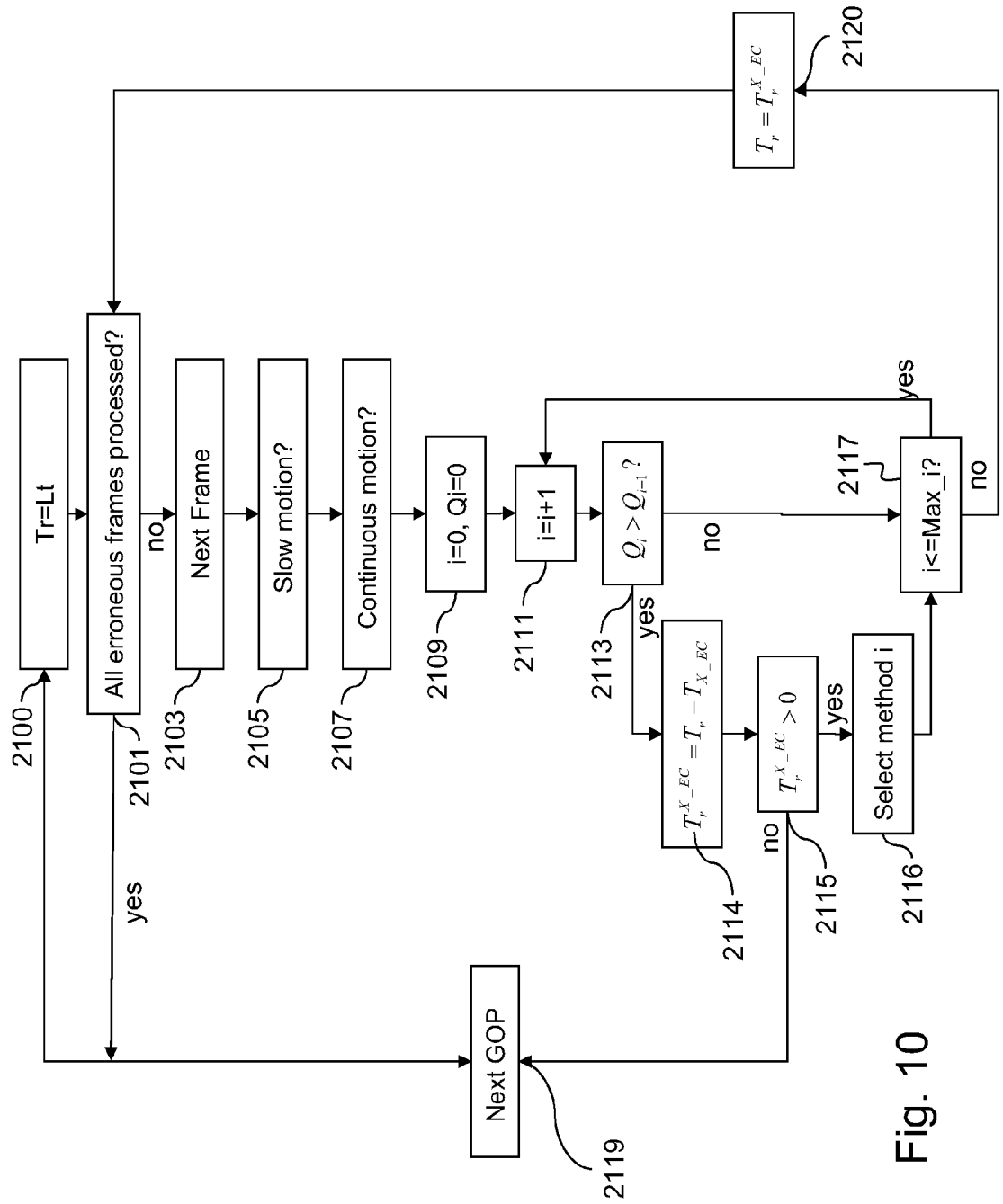

METHOD AND DEVICE FOR RECONSTRUCTING A SEQUENCE OF VIDEO DATA AFTER TRANSMISSION OVER A NETWORK

FIELD OF THE INVENTION

This invention relates to a method of reconstructing a sequence of video data in a receiving device after transmitting the encoded video sequence over a network.

BACKGROUND OF THE INVENTION

In the field of video transmission over a network it is known to encode a sequence of video data in a server, transmit it over the network and receive it in a client machine or receiving device.

More particularly, the encoded video sequence comprises a plurality of containers of encoded video data which are transmitted over the network.

On the client side the containers of encoded video data are decoded in order to reconstruct the containers of video data of the sequence as sent by the server.

However, when the network is not reliable, i.e. when it does not provide stable or reliable transmission conditions, data losses may occur during the transmission.

Thus, the whole of or part of some of the containers of encoded video data sent by the server may not be received.

This may cause some inconvenience when implementing the reconstruction process within the client machine.

To that end, an error concealment process is implemented within the client machine for applying an error concealment method, thereby enabling the video data of the lost containers to be reconstructed.

The above situation applies, inter alia, in the context of SVC ("Scalable Video Coding") video transmission where the containers of video data are encapsulated within RTP packets of data (RTP meaning "Real-time Transport Protocol") which are transmitted over an unreliable network under RTP.

Further, the above also applies to video transmission in accordance with the H.264 video format.

It is known from US 2008232478 to apply an error concealment method selected from a spatial error concealment method and a temporal error concealment method.

The selection is based on different methods depending on whether the damaged frame of the video sequence is:
an INTRA frame,
an INTER frame, or
a frame representing a change of scene.

It is to be noted that the implementation of the above necessitates receiving at least the header of the damaged frame to be able to identify its INTRA or INTER type. Furthermore, there is still some room for improving the quality of the reconstructed video.

SUMMARY OF THE INVENTION

The invention aims at remedying at least one of the above-mentioned drawbacks.

An object of the invention is a method of reconstructing a sequence of video data in a receiving device after the video sequence has been transmitted in encoded form over a network, the encoded video sequence comprising containers of encoded video data, wherein the method includes:
determining containers of encoded video data affected by data losses during their transmission over the network,
determining the time that would be necessary for decoding said containers of encoded video data affected by data losses if they had not been affected by data losses,
allocating the time thus determined to reconstructing video data of the sequence.

Correspondingly, the invention also relates to a device for reconstructing a received sequence of video data after the video sequence has been transmitted in encoded form over a network, the encoded video sequence comprising containers of encoded video data, wherein the device includes:
means for determining containers of encoded video data affected by data losses during their transmission over the network,
means for determining the time that would be necessary for decoding said containers of encoded video data affected by data losses if they had not been affected by data losses,
means for allocating the time thus determined to reconstructing video data of the sequence.

The invention makes it possible to efficiently schedule the reconstruction process of the video sequence according to errors which occurred during the transmission of the containers of encoded video data.

More particularly, this scheduling is made possible thanks to the determination of the time freed by not decoding the erroneous containers of encoded video data. This freed time is then appropriately allocated to the reconstruction process, for example for reconstructing the containers of encoded video data affected by data loss.

The containers of encoded video data affected by data loss may be directly affected, thereby meaning that data loss occurs in the container itself.

A container may also be indirectly affected by data loss. For example the container concerned depends on a previous container for its decoding and data loss occurs in the previous container.

The invention makes it possible to improve the quality of reconstruction of a video sequence within a device receiving the video sequence in encoded form.

Also, the invention makes it possible to improve the process of reconstructing a video sequence within a device receiving the video sequence in encoded form.

It is to be noted that the invention provides a new method and device for improving the use of the resources for reconstructing a video sequence within a device receiving the encoded video sequence.

According to one feature, the method includes a step of selecting, according to the time determined, one or several reconstruction processes from a set of predetermined reconstruction processes comprising a plurality of error concealment processes and the retransmission of at least some of the video data affected by data losses.

The best reconstruction process providing the best quality for a given situation is therefore selected.

According to the time freed thus determined one or several reconstruction processes may be selectively applied to the video data.

It may also be envisaged that the implementation of a reconstruction process or the retransmission process exceeds the time freed thus determined.

In this case, it may be decided to implement such a reconstruction process or retransmission process and not to decode one or several received containers of encoded video data.

According to one feature, the method further includes a step of determining the importance of the containers of encoded video data affected by data losses in terms of impact on the quality of reconstruction of the sequence of video data without these containers.

Determining the importance of the containers affected by data loss is useful in deciding which data will have to undergo a reconstruction process and which type of reconstruction process will be applied.

One can easily understand that reconstruction of a data container having a great impact on the quality of reconstruction/decoding of the video sequence should take priority over the reconstruction of a data container having a low impact thereon. In addition, most efficient reconstruction process should be applied to data containers having a great impact on the quality of reconstruction.

It is to be noted that the determination of the importance depends on the identification of the containers of video data affected by data loss and their localization in the video sequence.

To that end, the method further includes a step of classifying the containers of encoded video data affected by data losses according to their importance thus determined.

Thus, this classification enables the containers of video data to be ranked on a scale of importance. The most important containers are therefore identified.

According to one feature, the selection of one or several reconstruction processes is made according to the importance determined for the containers of encoded video data affected by data losses.

Thus, this criterion of importance is taken into account when deciding on the reconstruction given the time freed.

The criterion of importance helps to select an appropriate reconstruction process or processes for the containers concerned.

For instance, it might be wiser to request a retransmission of video data of an important container rather than apply a concealment process to the damaged video data.

This can be expected to be all the more true where several other containers of video data may have been indirectly affected by the data losses that occurred in the important container.

If several containers having suffered losses are of importance and the freed time is sufficient, all the video data affected by losses will be reconstructed. Depending on the time available, an error concealment process may be applied to at least some of the video data affected by data losses and/or a retransmission request may be sent for the most important containers.

In a general manner, a trade-off has to be made taking into account the time available, the importance and the number of the containers having suffered data loss and the type of reconstruction process.

It is to be noted that the selection may depend on the ranking order of the containers.

According to another feature, each reconstruction process is defined both by a quality indicator representing the quality of reconstruction associated therewith and by an estimated implementation time needed therefor.

It is to be noted that the estimated implementation time is the time the reconstruction process is expected to take.

As a consequence, reconstruction processes can be compared with respect to the quality they are expected to provide and to their estimated implementation time.

According to one feature, the selection of one or several reconstruction processes is made according to the quality indicator and the estimated implementation time associated with each reconstruction process.

The quality indicator and the estimated implementation time associated with each reconstruction process are helpful to select an appropriate reconstruction process given the time constraint.

It allows to select the best set of reconstruction processes to be applied on a set of frames of the video sequence (e.g. a "Group of Pictures") suffering errors.

According to one feature, the selection of one or several reconstruction processes is made according to the importance determined for the containers of encoded video data affected by data losses, the quality indicator and the estimated implementation time associated with each reconstruction process.

Taking into account all these criteria makes it possible to select the most appropriate reconstruction process or processes for the containers concerned.

According to one feature, the video sequence comprises a plurality of frames, each container of encoded video data including at least one portion of a frame that is divided into blocks of data, called macroblocks, the time determined depending on a mean time for decoding a macroblock and the number of macroblocks contained in the at least one portion of frame.

Advantageously, the determination of the time that would be necessary for decoding the containers affected by data losses is fast, since it is based on a simple computation based on a mean time for decoding each macroblock.

According to another feature, the video sequence comprises a plurality of scalability layers, the mean decoding time of a macroblock depending on the scalability layer of the corresponding container of encoded video data.

In other terms, the mean decoding time depends on the display resolution of the frame concerned.

According to still another feature, the mean decoding time of a macroblock depends on the fact that the macroblock is in a scalability layer that is partially decoded or not.

Thus, the mean decoding time varies in accordance with the scalability layer.

In particular, the mean decoding time differs between the topmost layer and the lowest layers.

According to one feature, the video sequence comprising a plurality of frames, among the containers of encoded video data corresponding to a set of encoded frames and that are transmitted over the network at least one of the containers is affected by data losses and the others are correctly received, the method including a step of decoding containers of encoded video data that are correctly received and a step of reconstructing the video data of the at least one container affected by data losses, the step of decoding being carried out taking into account the time determined and allocated to reconstructing said video data.

According to one feature, a predetermined decoding time is necessary for decoding all the containers of encoded video data corresponding to a set of encoded frames, said decoding time being shared between a time devoted to decoding containers that are correctly received and a time that is necessary for reconstructing video data affected by data losses.

Thus, the predetermined decoding time dedicated to the decoding of a set of encoded frames is shared between a decoding process time and a reconstruction process time in accordance with the time freed as described above.

According to another feature, one or several containers of encoded video data correctly received are not decoded if the time that is necessary for reconstructing video data affected by data losses exceeds the time determined and allocated to reconstructing said video data.

In case more time is needed for the implementation of the reconstruction process, it may be decided not to decode one or several correctly received containers of encoded video data.

This decision may be taken based on the importance of the containers of encoded video data.

Another object of the invention is a method of reconstructing a sequence of video data in a receiving device after the video sequence has been transmitted in encoded form over a network, the encoded video sequence comprising containers of encoded video data, the method including a reconstruction process comprising applying an error concealment method to at least some of the containers of encoded video data affected by data loss and/or decoding the correctly received containers of encoded video data, the method including:
- determining containers of encoded video data affected by data loss during their transmission over the network,
- determining the time necessary for decoding said containers of encoded video data affected by data loss if they had not been affected by data loss,
- scheduling the reconstruction process according to said determined time.

A further object of the invention is a method of reconstructing a sequence of video data in a receiving device after the video sequence has been transmitted in encoded form over a network, the encoded video sequence comprising containers of encoded video data, wherein the method includes:
- determining containers of encoded video data affected by data loss during their transmission over the network,
- determining the time that would be necessary for decoding said containers of encoded video data affected by data loss if they had not been affected by data loss,
- allocating the time thus determined to applying an error concealment method to at least the containers of video data affected by data loss and/or decoding at least some of the containers of encoded video data not affected by data loss.

The invention also relates to an information storage means which can be read by a computer or a microprocessor containing code instructions of a computer program for executing the steps of the method according to the invention as briefly disclosed above.

This information storage means may be partially or totally removable, thereby enabling it to be easily inserted in an apparatus for the execution of the method steps.

As the features and advantages relating to the device and to the information storage means are the same as those disclosed above concerning the method according to the invention, they will not be repeated here.

BRIEF DESCRIPTION OF THE DRAWINGS

Other features and advantages of the present invention will emerge more clearly from a reading of the following description, given only by way of non-limiting example with reference to the accompanying drawings, in which:

FIG. 10 is an algorithm detailing step 815 in FIG. 4.

DETAILED DESCRIPTION

Figure 1:
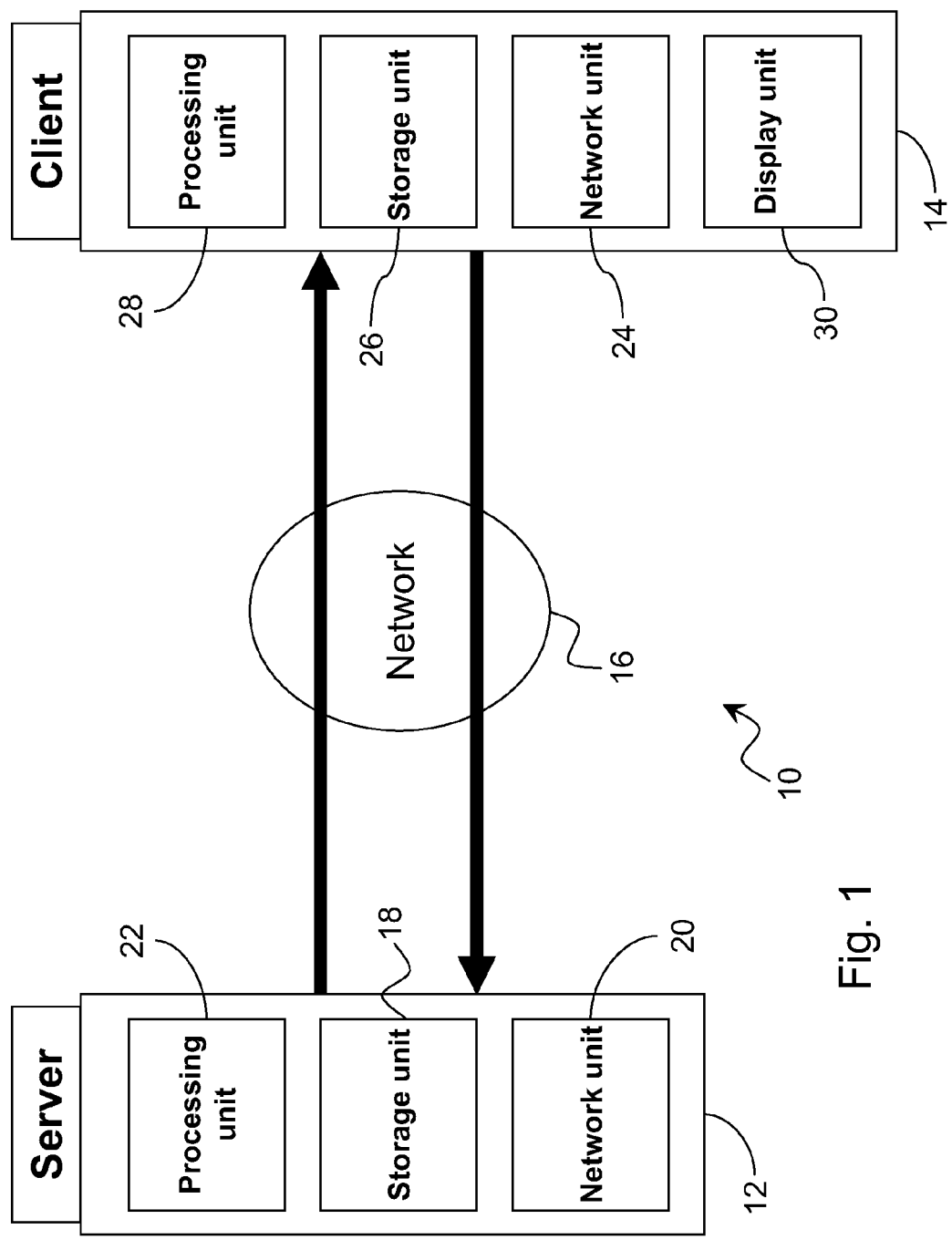
FIG. 1 is a diagrammatic view of a video transmission system according to an embodiment.

FIG. 1 schematically represents a video transmission system 10 according to an embodiment.

The system comprises a transmitting device 12 such as a server, a receiving device 14 such as a client, and a network 16 there between interconnecting the devices 12 and 14.

It is to be noted that the network does not guarantee stable or reliable transmission conditions.

Typically, data that are available in the transmitting device 12 are suffering losses during their transmission in encoded form over the unreliable network.

The receiving device 14 will therefore receive encoded data affected by losses, which will raise, inter alia, quality problems when reconstructing/decoding the data as sent by the device 12.

More particularly, the transmitting device 12 includes a storage unit 18 storing video data of a video sequence. The video sequence is encoded according to a video format. The encoded video sequence comprises a plurality of containers of encoded video data which are each stored in the unit 18 before being sent to the client.

The transmitting device 12 further includes a network unit 20 which is able to transmit video data in packets of data each including one or several containers of encoded video data.

The transmitting device 12 also includes a processing unit 22 that is able to run computer programs.

The preferred video formats used in this embodiment are the SVC and H.264 video formats.

SVC ("Scalable Video Coding") is a new video standard extending the H.264 format with scalability features. The H.264 format constitutes the state of the art in terms of video compression. This standard developed by JVT (Joint Video Team) has significantly increased the efficiency of compression compared with other video standards such as MPEG-2, MPEG-4 part 2 and H.263. In terms of technology, H.264 is based on the conventional hybrid scheme using a combination of a spatial transform and a motion estimation/compensation. However, this overall scheme has been optimized to obtain a better efficiency of compression as indicated below:
- replacement of the traditional 8×8 DCT transform by an equivalent integer 4×4 transform;
- ¼ pixel motion estimation;
- variable macroblock shape;
- use of new arithmetic and VLC coding (CABAC, CAVLC);
- intra prediction, etc.

Figure 2:
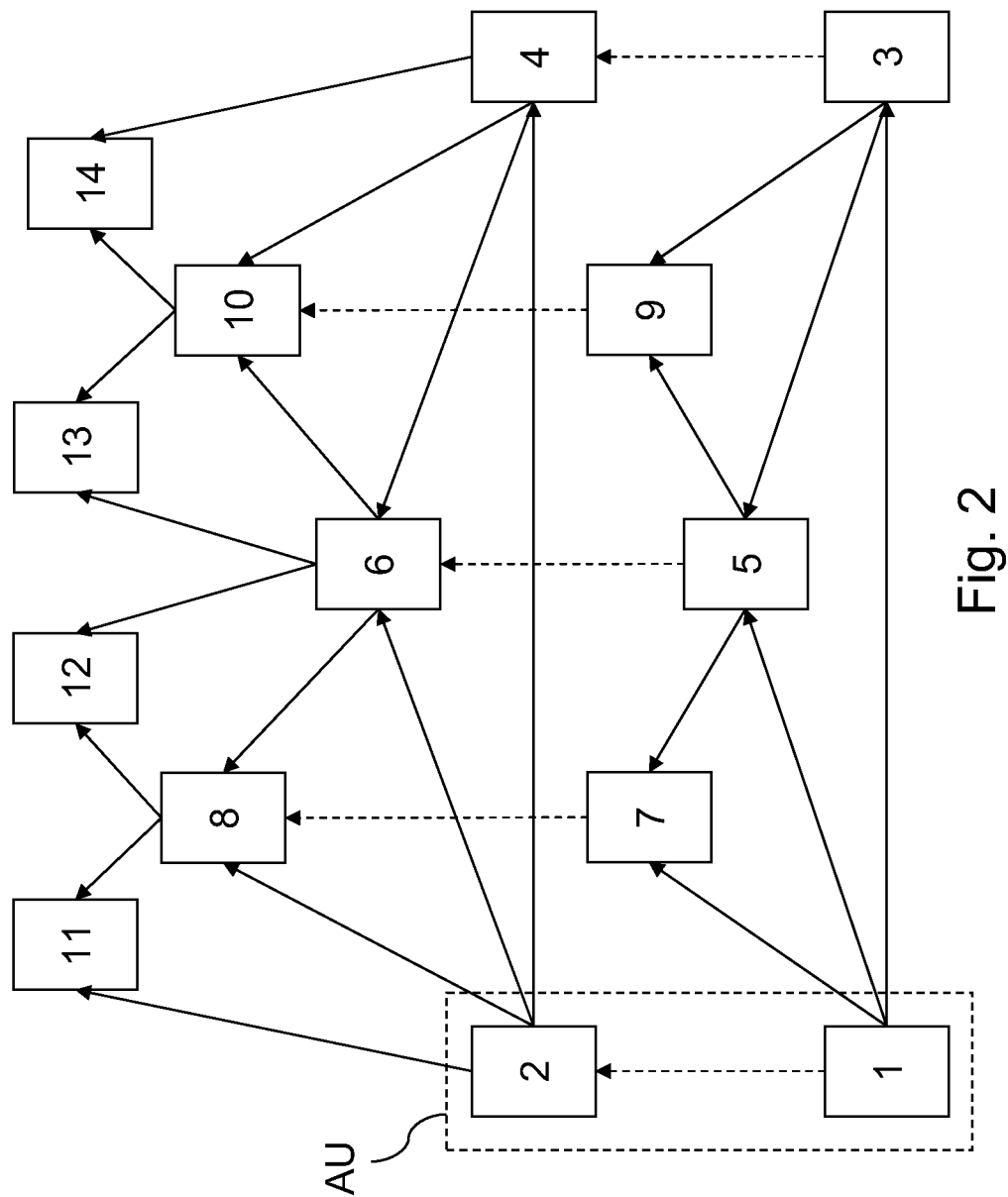
FIG. 2 is an example of an SVC video sequence having two scalable layers.

The SVC standard has added adaptation capabilities to the H.264 standard in the form of scalability features. Three scalability axes have been defined in the SVC standard and are represented in FIG. 2 in the form of spatial scalability, temporal scalability and quality scalability.

The temporal scalability allows the temporal resolution of a video sequence to be modified by removing some frames of the sequence, the removal taking into account the dependencies between the frames.

The spatial scalability consists in inserting several resolutions in a video sequence, the lower resolution being used for the prediction of the higher resolutions. One particularity of SVC is to make it possible to obtain any resolution ratio between two successive spatial resolutions even though only a ratio of two was obtained by previous scalable codecs.

The quality scalability, also known as SNR scalability (SNR stands for Signal to Noise Ratio), takes the form of Coarse Grain Scalability (hereinafter referred to as CGS), Medium Grain Scalability (hereinafter referred to as MGS) and Fine Grain Scalability (hereinafter referred to as FGS).

CGS SNR scalable coding is achieved using the same concepts as those used with the spatial scalability. The only difference is that for CGS the upsampling operations of the inter layer prediction is omitted.

FGS scalability results in a bitstream that can be truncated at any point, without adversely affecting the performance of the decoding process. This feature is particularly advantageous for precisely adapting the video bitrate to an available bitrate, for example for transmission over the network.

MGS has been defined as scalability that is intermediate between CGS and FGS. It provides finer decoding points in the bitstream than CGS does but, unlike FGS, is not able to provide a truncation at any point in the bitstream. According to a number of encoding and network experts, MGS provides sufficient granularity given realistic network conditions.

According to the H.264 and SVC standards, the transmission of a video sequence or stream over a network is facilitated with the concept of Network Abstraction Layer (hereinafter referred to as NAL). A NAL unit is a kind of container having a header and a data part containing video data. The header includes a short description of the video data contained in the data part. An SVC NAL unit header is composed of two parts.

The first part of the NAL unit header has been inherited from the H.264 standard and comprises three elements:

1) forbidden_zero_bit: this is the first element and is used for error resilience;

2) nal_ref_idc: this is the second element and if not equal to 0 specifies that the NAL unit contains data necessary to decode following data; the NAL unit being able to transport, for instance, a reference picture for the motion compensation;

3) nal_unit_type: this is the third element and indicates the type of data contained in the NAL unit. Most usual types of data are provided below:

nal_unit_type=1: picture or slice compatible with the H.264 specification;

nal_unit_type=5: reference resynchronization picture or slice, a slice being a group of macroblocks of a picture;

nal_unit_type=7: sequence parameter set (a particular NAL unit describing a video sequence);

nal_unit_type=8: picture parameter set (a particular NAL unit providing a description of a set of frames referring to it);

nal_unit_type=20: SVC picture or slice.

The second part of the NAL unit header adds the following SVC information to the H.264 header:

reserved_one_bit: element used for error resilience;

idr_flag: element indicating if the NAL unit contains data necessary to decode following data;

priority_id: specifies a priority identifier for the NAL unit;

no_inter_layer_prediction_flag: indicates if inter layer prediction is used to decode the contained video data;

dependency_id (Did): specifies the spatial layer of the contained video data;

Quality_id (Qid): specifies the quality layer of the contained video data;

Temporal_id (Tid): specifies the temporal layer of the contained video data;

Use_ref_base_pic_flag: specifies that the reference base pictures are used for inter layer prediction;

Discardable_flag: specifies if the current NAL unit is used for decoding any other NAL unit;

Output_flag: specifies if the video data contained in the current NAL unit will be outputted by the decoder;

Reserved_three_bits: shall be equal to 3.

For example, the packets of data which are transmitted over the network 16 (FIG. 1) are in conformity with the protocol of transmission known as RTP (Real-time Transport Protocol).

An RTP packet includes a header and a payload containing the video data, in particular the NAL units data containers. The header contains information and, in particular, two items of information, namely a sequence number and a timestamp. The sequence number is randomly chosen for the first packet of a streaming session and its value is incremented by one every time a new packet is created for this application. The timestamp represents the time of creation of the transported data.

It is to be noted that in the SVC standard, all items of data corresponding to a particular time should have the same timestamp in case they are transported by several packets of data in a single network session.

In the preferred embodiment, the NAL units which are used as containers for transporting the data are compliant with the SVC extension header. As a consequence, the H.264 video data will be transported as SVC data, and will be considered by the receiving device 14 in FIG. 1 (client) as SVC data with only one spatial and quality layer.

Furthermore, an RTP packet may include one or several NAL units in its payload.

The receiving device 14 (client) comprises:

a network unit 24 dealing with the reception of transmitted encoded video data in the form of containers of encoded video data, a storage unit 26 for storing data whether encoded or not, a processing unit 28 that is suitable for executing the method and the computer programs in accordance with the invention, and a display unit 30 for displaying the sequence of video data after implementing the method according to the invention.

Figure 3:
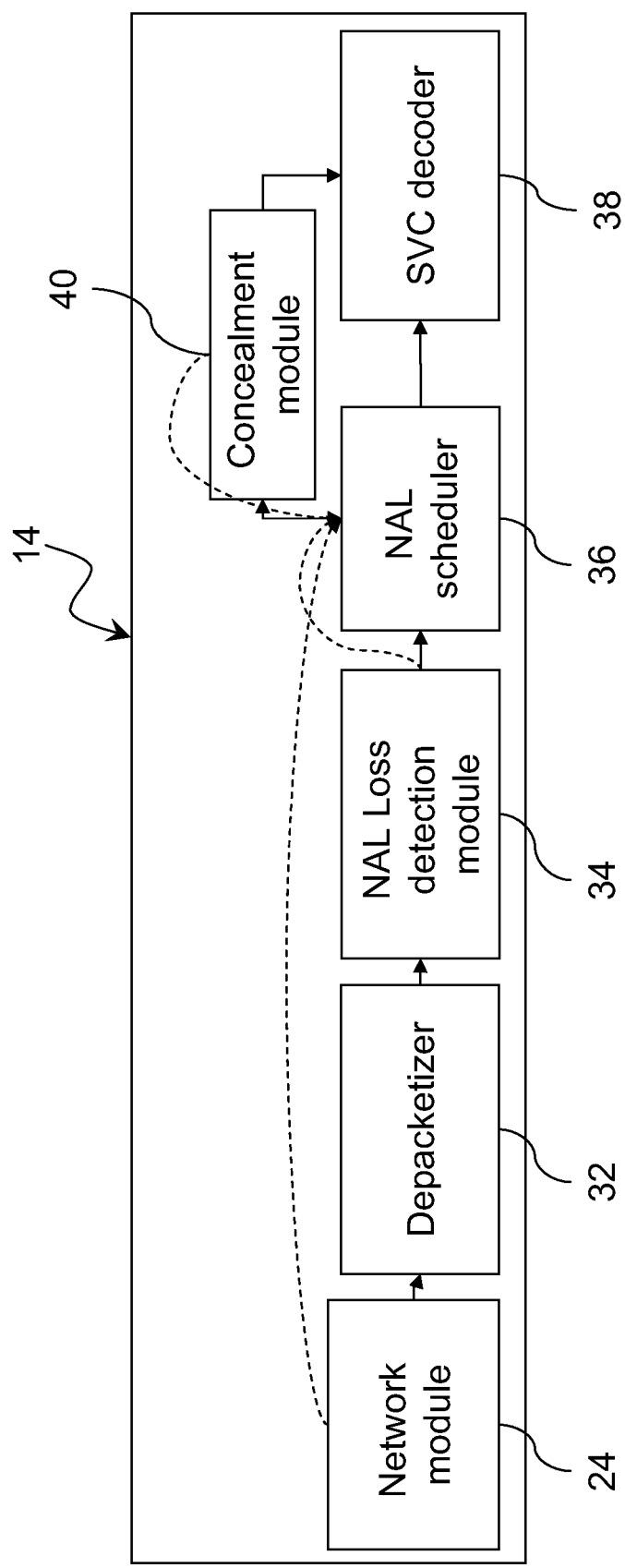
FIG. 3 is a more detailed view of the receiving device of FIG. 1.

FIG. 3 illustrates in greater detail the configuration of the receiving device enabling reconstruction of a sequence of video data that has suffered data losses while being transmitted over the network, or reconstruction of only a part of the sequence.

The device 14 includes six main modules which can be either hardware or software implemented.

The RTP packets transmitted over the network by the transmitting device 12 (server) are received by the network module or unit 24 if not lost during the transmission.

It is to be noted that a packet affected by data losses will be considered as lost.

The received packets are then supplied to a depacketizer or depacketizing unit 32 which extracts the NAL units (containers of encoded video data) from the RTP packets. In the course of the depacketization process additional information is also extracted from the RTP packet headers and the NAL unit headers and stored in the storage unit 26 of FIG. 1.

The extracted NAL units and additional information are then sent to a NAL unit loss detection module 34 which determines the NAL units affected by data losses during their transmission. It is to be noted that the determined NAL units are those that have been lost in the course of the transmission (direct losses) as well as those indirectly affected by data losses. These indirectly affected NAL units are linked with the lost NAL units. For example, the indirectly affected or damaged NAL units may contain encoded video data whose encoding depends on encoded video data contained in one or several lost NAL units.

The module 34 is not only able to identify/detect the NAL units affected by data losses but also to localize these NAL units within the video sequence and, more particularly, within the frames of the sequence.

In particular, the NAL unit loss detection module 34 accumulates, i.e. stores the received NAL units corresponding to a Group of Pictures (hereinafter referred to as GOP) or the received NAL units located between two IDR frames.

An IDR frame is a synchronization frame defined in the SVC standard.

The information representing the result of this determination process (NAL units affected directly or indirectly by data losses and their location) is next supplied to another module 36, called NAL unit scheduler. Based on this information, the NAL unit scheduler 36 determines the time that would be necessary for decoding the NAL units affected by data losses if they had not been affected by data losses. According to the time thus determined, the NAL unit scheduler 36 selectively switches at a scheduled time between a decoding unit decoder 38 and a concealment module 40 for processing the NAL units concerned, namely the NAL units of the GOP or NAL units between two IDR frames.

If the NAL units have been correctly received, the scheduler 36 decides to send them to the decoder 38.

The decoder 38 receives one of the correctly received NAL units and carries out the decoding process of this NAL unit.

It is to be noted that the SVC standard has defined a set of rules regarding the decoding order of SVC NAL units.

Firstly, a NAL unit shall be decoded before any NAL unit dependent on it. Secondly, all the NAL units corresponding to an AU (AU stands for "Access Unit" which defines all the NAL units corresponding to the same encoded frame) shall be decoded before decoding any other NAL unit from another AU.

In FIG. 2, the decoding order induced by the above rules applied to a SVC video sequence composed of two scalable layers (spatial or SNR) has been represented: the first layer is composed of frames numbered 1, 3, 5, 7, 9 and the second layer is composed of frames numbered: 2, 4, 6, 8, 10, 11, 12, 13, 14. In this instance the second layer has a higher frame rate than the first layer. The number indicated in each frame of the sequence represents the decoding order to be followed. The arrows between the frames represent the decoding dependencies. An "Access Unit" AU has been represented also on FIG. 2.

If the NAL units have been lost or incorrectly received, i.e. they cannot be decoded, then these NAL units are processed by the concealment module 40 selected by the scheduler 36.

At least two concealment methods or processes may be selectively applied, the applied method depending on the result of the determination process and at least one parameter that will be defined subsequently.

If a decision has been taken as to the sending of a retransmission request, the processing of the retransmitted NAL units will then be made by the decoder 38 if correctly received.

It is to be noted that each of the modules 38 and 40 is able to apply a type of reconstruction process within the meaning of the invention.

Figure 4:
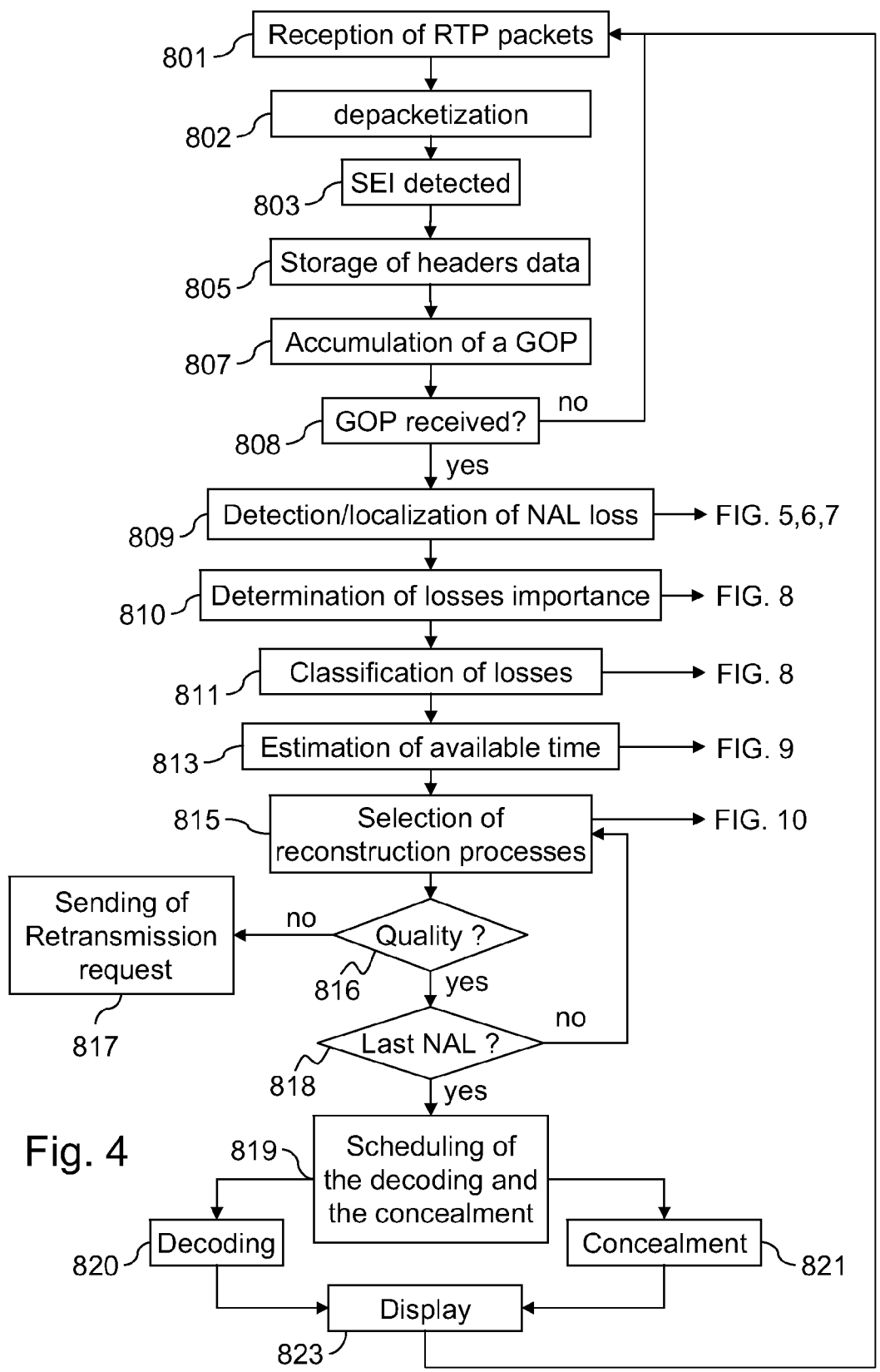
FIG. 4 is an algorithm of a method of reconstructing a video sequence according to an embodiment.

FIG. 4 depicts an algorithm stored within the client receiving device 14 and whose steps are executed upon command for implementing the method according to one embodiment of the invention.

The algorithm includes a first step 801 of receiving RTP packets by the network module 24. The received packets are next sent to the depacketizer 32 which extracts the NAL units from the RTP packets (step 802).

Further, additional information/data are also extracted from the received RTP packets and NAL units in the course of step 802. More particularly, this specific additional information is extracted from the RTP headers, namely:

The RTP sequence number;
The RTP timestamp;
and from the NAL unit headers, namely;
    The NAL unit type indicating the type for the NAL unit;
    The Dependency Id (Did) indicating the spatial layer of the NAL unit;
    The Temporal Id (TId) indicating the temporal layer of the NAL unit;
    The quality Id (QId) indicating the quality layer of the NAL unit.

A particular type of NAL unit is searched for at the beginning of each video sequence: the scalable information SEI message defined in section G.13.1.1 of the Join draft ITU-T Rec. H.264/ISO/IEC 14496-10/Amd; 3 Scalable Video Coding, T. Wiegand, G. Sullivan, J. Reichel, H. Schwartz, M. Wien, 24th JVT meeting, Geneva, Switzerland, July 2007. This NAL unit is of particular interest since it describes the size and the structure of the GOP in the SVC sequence to be determined. It is assumed here that an SVC sequence is a set of frames starting with an IDR frame. As a consequence, a video sequence containing several IDR frames is considered as several concatenated sequences. Further, it is also assumed that a scalable information SEI message is transmitted at the beginning of each sequence. Once detected during step 803, the scalable SEI message is analyzed in order to determine the desired information. If the SEI message is not detected, step 802 is directly followed by step 805.

During step 805 header data extracted at step 802 is stored for each NAL unit received.

The NAL units received are accumulated until the end of the GOP has been attained during step 807. Once this end has been reached (positive result of test step 808) the determination of the NAL units affected by data losses is being carried out at step 809. More particularly, this step aims at detecting and localizing the NAL units affected by data losses.

This process will be further described later on with reference to FIGS. 5, 6 and 7.

If there are any received NAL units left to be dealt with to complete the GOP, test step 808 returns to step 801 already described to process other received packets. After step 809, the NAL units affected by data losses are accurately localized. It is therefore exactly known which frame and in this frame which temporal, spatial and quality layer has been affected by these losses.

Next, step 810 is carried out.

In the course of execution of this step, the importance of each of the detected and localized NAL units affected by data losses is determined.

This feature of importance of a NAL unit represents the impact of the losses on the quality of the encoded video data decoded (quality of reconstruction) in the absence of the NAL unit concerned.

If the quality of the encoded video data thus decoded is poor, this means that the NAL unit affected by data losses is of great importance.

In contrast, a good quality of reconstruction means that the NAL unit is not so important.

Step 810 will be described in more detail referring to FIG. 8.

Step 810 is followed by a step 811 of classifying the NAL units affected by data losses on a scale of importance.

Each NAL unit will thus be classified with respect to the other NAL units according to their importance determined at step 811.

Step 811 will be described in more detail referring to FIG. 8.

Next step 813 makes provision for determining the time necessary for decoding the NAL units affected by data losses if they were not affected by data losses, i.e. if correctly received.

The time thus determined which will therefore not be spent on the decoding of these NAL units can be considered as the time freed by the loss of data.

Step 813 will be further described with reference to FIG. 9.

The following steps are dedicated to allocating the freed time thus determined to reconstructing the video data of the sequence affected by data losses, so as to improve the quality of reconstruction of the video sequence.

Step 813 is followed by step 815 which makes provision for selecting a reconstruction process for each frame affected by data losses from a set of predetermined reconstruction processes. The set includes at least two concealment processes as well as, optionally, the process of retransmission of at least some of the video data affected by data losses. The selection made depends on the time freed at step 813. The time freed is considered as a parameter used for selecting a reconstruction process. This step will be described in more detail with reference to FIG. 10.

It is to be noted that in some circumstances the time that is necessary for carrying out a process may exceed the time freed.

However, it may be of interest to select such a process when the NAL unit affected by data losses turns out to be particularly important.

If the retransmission process has been selected, then a request for retransmission of video data concerned is sent to the server.

Otherwise, if a concealment process has been selected, a test step 816 is carried out for each NAL unit affected by data losses.

In the course of execution of step 816, it is checked whether the selected reconstruction process (error concealment process) provides satisfactory quality in terms of reconstruction of the NAL unit affected by data losses.

If the quality of reconstruction turns out not to be sufficient with respect to a predetermined quality threshold, then a request for retransmission of the packet including the NAL unit affected by data losses is sent to the server (step 817).

If the quality proves to be satisfactory, the concealment process selected in conjunction with the NAL unit affected by data loss is maintained.

A test step 818 makes it possible for all the NAL units affected by data losses to be processed likewise.

If NAL units remain to be processed, step 818 returns to step 815 already described.

When test step 818 provides a positive result (all the NAL units have been dealt with), next step 819 schedules either the decoding or the error concealment of the NAL units belonging to the GOP (or located between two IDR frames).

If the NAL units have been correctly received, i.e. they have not been affected directly or indirectly by data losses, a usual decoding process is performed at step 820.

If the NAL units have been incorrectly received, i.e. they have been affected directly or indirectly by data loss during their transmission over the network, the error concealment process selected at step 815 for the frame is applied at step 821.

Each of steps 820 and 821 is followed by step 823 which makes provision for displaying the resulting frame.

If the resulting frame has been correctly received in entirety this means that it has been decoded in a conventional manner through step 820.

If it has been incorrectly received in whole, all the NAL units containing the encoded video data relating to this frame have been subjected to a concealment process through step 821.

If it has been incorrectly received in part, only the NAL units affected by data losses have been concealed through step 821, the other NAL units having been conventionally decoded.

Step 823 is next followed by first step 801 already described above to process a following GOP.

It is to be noted that the concealment process (step 821) may take more time than the decoding process (step 820).

Given that constraint some frames of less importance may intentionally not be decoded.

As has been previously mentioned, step 809 in FIG. 4 will be now further described with reference to FIG. 5. The algorithm depicted in this Figure includes a set of steps the execution of which enables determination of the NAL units that have been directly affected by data losses.

More particularly, the detection/localization algorithm starts with step 1401. This step compares the RTP sequence number of the last received packet (SeqNum) to the RTP sequence number of the packet received immediately before the last received packet (SeqNum_). If the two sequence numbers differ by 1, it can be deduced that no loss has occurred and the detection/localization process comes to an end.

Otherwise, at this stage it is already known that at least one packet has been lost without knowing which NAL unit is affected by data loss. In the course of execution of the next step 1403, a comparison between the RTP timestamp of the last received packet (Timestamp) and the RTP timestamp of the packet received immediately before the last received packet (Timestamp_) is made.

If the two consecutive packets have the same timestamp, then a comparison is made between Did and Did_. (step 1407).

If Did=Did_, another test is carried out to know whether Qid=Qid_ during step 1409.

In the affirmative, it can be stated that a slice of the same AU, in the same spatial layer and the same quality layer as the last received NAL unit is missing (step 1425).

In the negative, a further test is carried out to determine whether Qid=Qid_+1 (step 1411).

In the affirmative, it can be stated that at least one slice of the same AU and the same spatial layer and with a quality layer equal to Qid_ or Qid_+1 is missing (step 1427).

Otherwise, if Qid is not equal to Qid_+1, it can be deduced that the NAL units with QId between Qid_ and Qid have been lost (step 1413).

Returning to step 1407, if the two consecutive packets have different Did, test step 1415 is performed to determine whether Did=Did_+1.

If not, this means that the NAL units with DId between Did and Did_ have been lost (step 1421).

Otherwise, if Did=Did_+1, another test is made in order to check whether Qid=0 or not (step 1417).

In the negative, it can be inferred that the NAL units with QId=0 and a QId<Oid have been lost (step 1423).

Otherwise, it can be stated that it is the same AU, in a new spatial layer and with a QId=0. Also, at least one slice with QId=0 is missing (step 1419).

Figure 5:
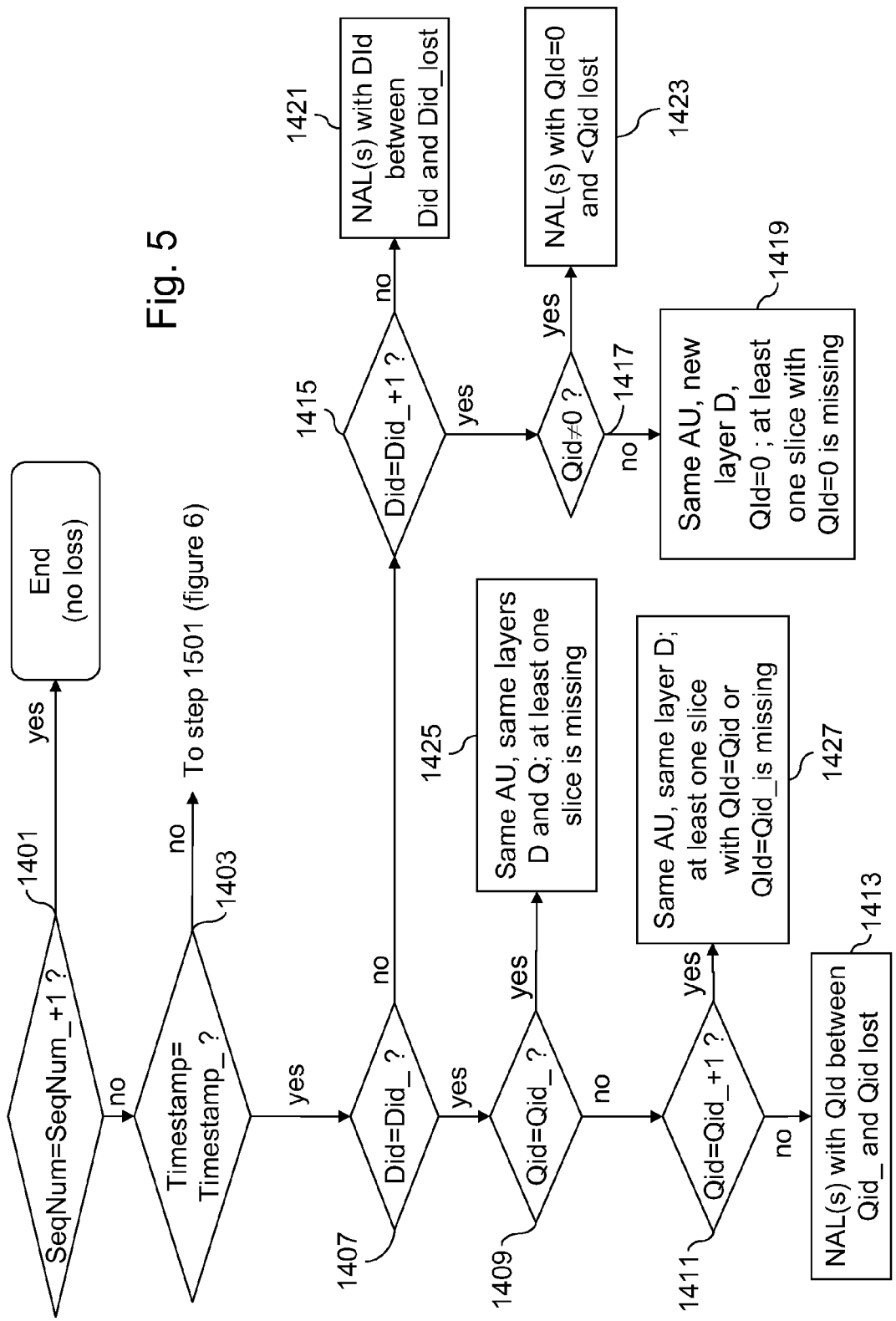
FIGS. 5, 6 and 7 depict different algorithms detailing step 809 in FIG. 4.
Figure 6:
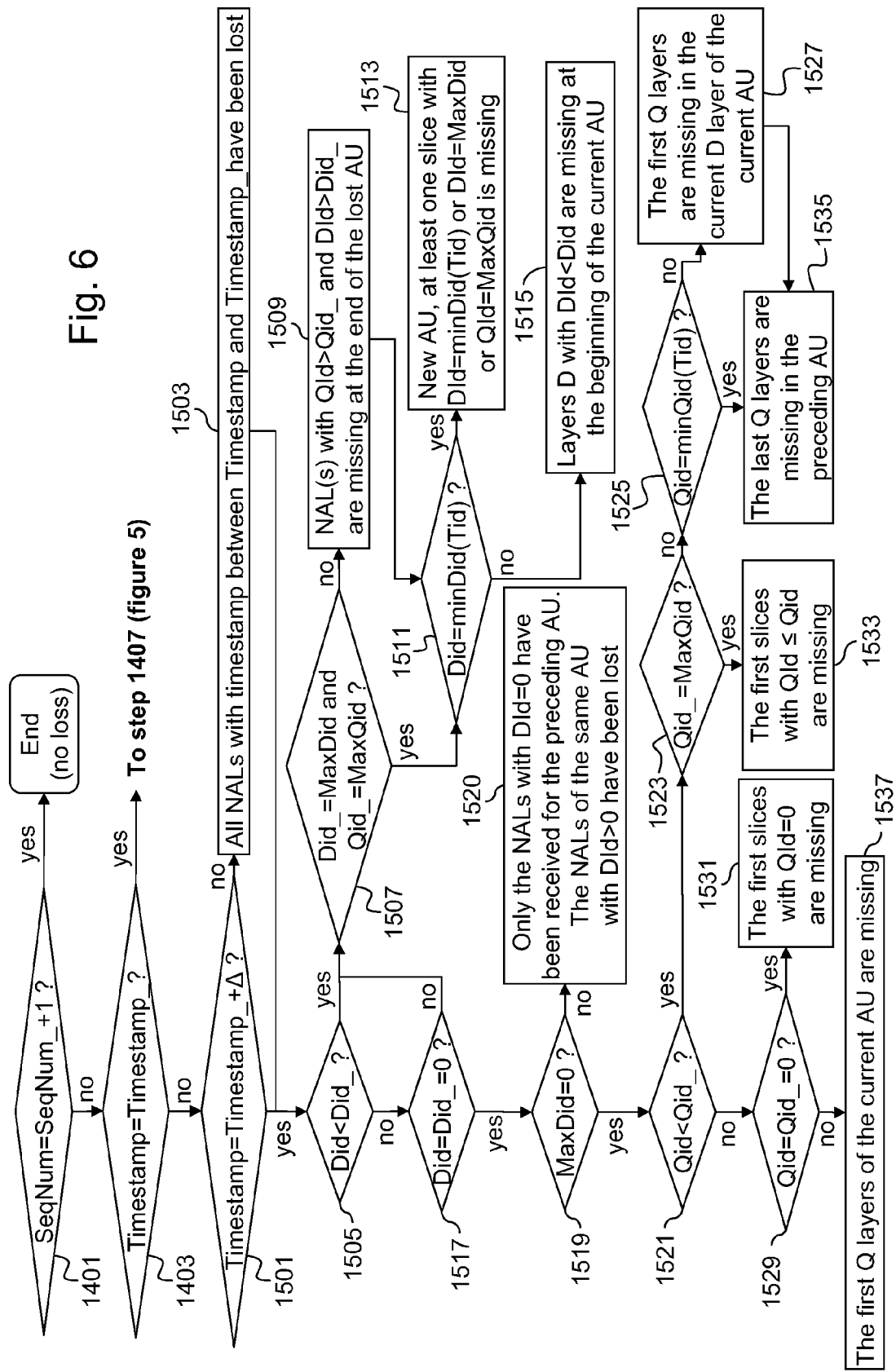

FIG. 6 represents an algorithm which completes the detection/localization algorithm of FIG. 5. More particularly, the FIG. 6 algorithm takes place when test carried out at step 1403 shows that the two consecutive packets have different timestamps (step 1403).

A further test is carried out at step 1501. During step 1501, if the difference between the two timestamps proves to be different from an authorized unit of time Δ, this means that all NALs units with timestamps that should have been received between timestamp_ and timestamp have been lost (step 1503). The value of Δ can be deduced from the value timestamp_, from the GOP representation providing the location of each frame in the GOP and the frame dependencies and by following the rules relating to the decoding order as defined in SVC standard. Steps 1501 and 1503 are each followed by step 1505 where a test is made in order to determine whether Did<Did_.

In the affirmative, another test is carried out to check if Did_ and Qid_ each have their maximum value (step 1507).

If not, the NAL units with QId>Qid_ and Did>Did_ are missing at the end of the last received AU (step 1509).

Steps 1507 and 1509 are followed each by step 1511.

In the course of execution of step 1511, a test is made to check if Did has its minimum value for the current Tid.

In the affirmative, it can be deduced at step 1513 that a new AU has been received and that at least one slice with DId=minDid(Tid) in the current AU or DId=maxDid or QId=maxQid in the previously received AU is missing.

In contrast, If Did is different from minDid(Tid), it can be deduced that the spatial layers (layers D) with DId<Did are missing at the beginning of the current AU (step 1515).

Reverting to step 1505, in the negative, a further test step 1517 is carried out. If Did=Did_=0 during step 1517, following step 1519 tests whether MaxDid=0.

In the affirmative, test step 1521, described later, is carried out. Otherwise, this means that only the NAL units corresponding to DId=0 have been received for the previous AU (step 1520).

Also, this means that the NAL units of this AU having higher values of DId (DId>0) have been lost.

If the test carried out at step 1517 is negative, step 1507 already described is executed.

As already mentioned step 1517 is followed by step 1521 which tests if Qid<Qid_. In the affirmative, it is checked whether Qid_=MaxQid at step 1523.

If yes, it can be deduced at step 1533 that the first slices with QId≦Qid are missing in the current AU.

If not, step 1523 is followed by step 1525 where a check is made as to whether Qid=minQid(Tid).

In the negative, it can be deduced that the first quality layers (Q layers) of the current spatial layer (D layer) in the current AU are missing (step 1527).

In the affirmative, the last quality layers are missing from the previous AU (step 1535).

Returning to step 1521, if the result of the test is negative, following test step 1529 is carried out.

If the test 1529 shows that Qid=Qid_=0, the first slices of the current AU with Qid=0 are missing (Step 1531). Otherwise, it can be deduced at step 1537 that the first quality layers of the current AU are missing.

If at step 1517 Did and Did_ are different from 0 step 1507 already described is returned to.

Figure 7:
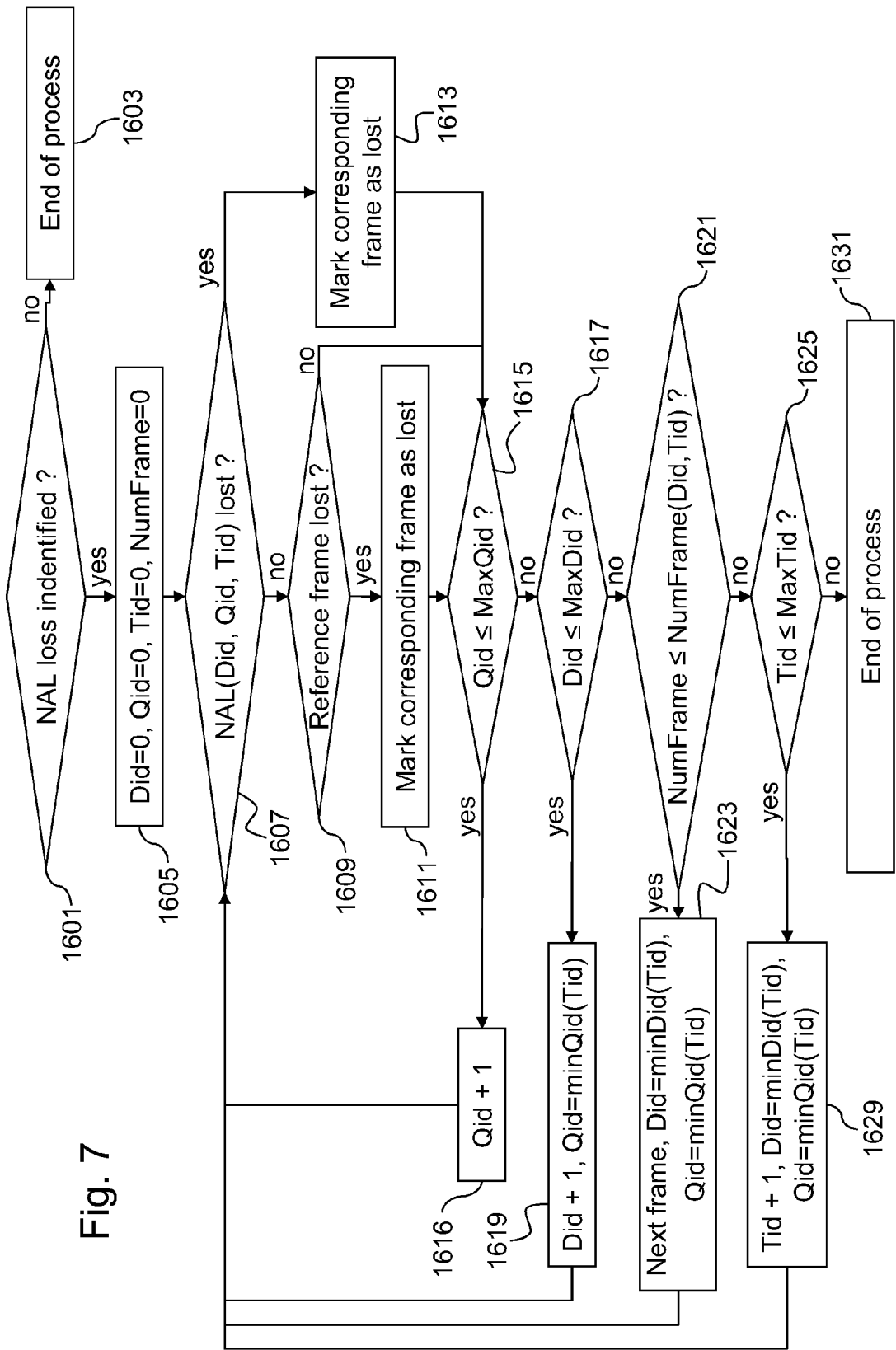

FIG. 7 depicts an algorithm the execution of which makes it possible to identify frames that have been lost directly or by virtue of error propagation (indirect losses).

Every time a data packet is received, the FIG. 7 algorithm is executed. The algorithm starts with step 1601 for determining whether a NAL unit loss was identified during the previous activation of the detection/localization process.

If no loss has previously been detected, the process comes to an end (step 1603). On the contrary, if a loss has been detected, the process goes on with the initialization of the variables Did, Qid, Tid and NumFrame to 0 (step 1605).

During next step 1607 a search of the NAL units identified as being affected by data loss is conducted by the detection/localization process.

If the NAL unit with the given value of Did, Qid and Tid (NAL (Did, Qid, Tid)) has been identified as being affected by data loss, the corresponding frame is marked as lost (even if a single slice of this frame has been lost) during step 1613. This step is followed by step 1615 which will be described subsequently.

If the considered NAL unit (NAL (Did, Qid, Tid)) has not been identified as being affected by data loss, it is checked whether the reference frame of this NAL unit had been lost (step 1609).

If not, this step is followed by step 1615.

If yes, the frame concerned is marked as lost at step 1611, which is followed by step 1615.

In the course of execution of step 1615, a check is made to determine whether all quality layers have been analyzed.

If not, Qid is increased by one at step 1616 and the process goes on with a new NAL unit as from step 1607.

In contrast, if all Qid values have been tested, step 1617 is performed.

In the course of execution of step 1617 a check is made to determine whether all spatial layers have been analyzed. If not, Did is increased by 1 and Qid is set to the minimum authorized value of Qid for the current value of Tid (step 1619) and the algorithm returns to step 1607.

Otherwise, if all Did and Qid for the current AU have been analyzed, it is checked during step 1621 whether all the frames in the GOP for the current temporal layer (Tid) have been analyzed.

In the negative, the process goes on with the next frame (step 1623). In addition, during step 1623, Did is set to the minimum authorized value of Did for the current value of Tid and Qid is set to the minimum authorized value of Qid for the current value of Tid and the algorithm returns to step 1607.

In the affirmative, if all the frames in the current temporal layer have been analyzed, a check is carried out to determine whether all temporal layers have been tested during step 1625. If not, step 1625 is followed by step 1629 which increases the temporal layer and sets Did and Qid to their minimum values for the current value of Tid. If yes, the process comes to an end with step 1631.

Otherwise, all the frames or NAL units lost directly due to a packet loss or indirectly due to an error propagation have now been identified.

As previously announced steps 810 and 811 which refer to NAL units in FIG. 4 will now be described with reference to FIG. 8 which more generally deals with a set of frames (GOP) in the video sequence.

Figure 8:
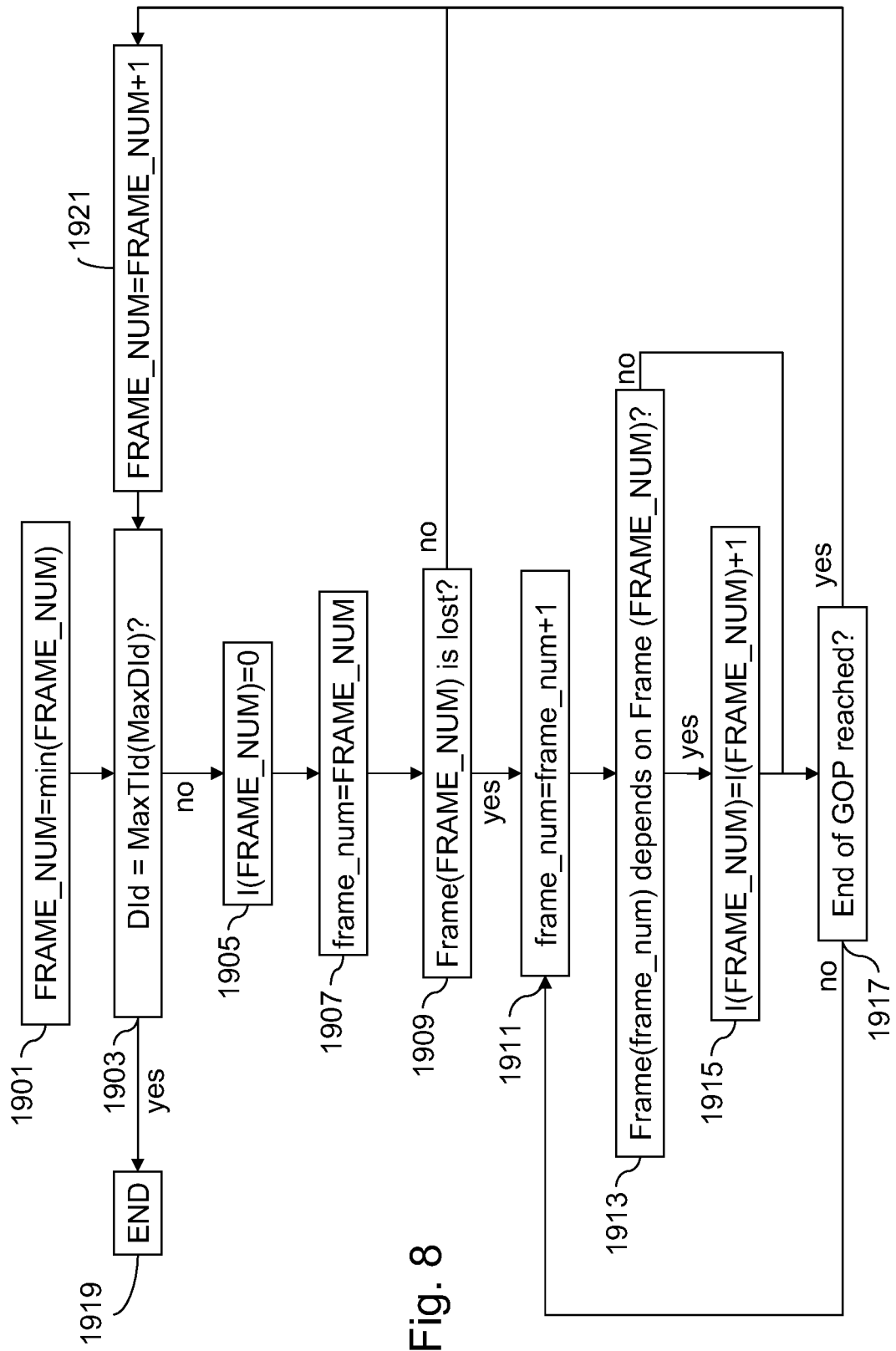
FIG. 8 is an algorithm detailing steps 810 and 811 in FIG. 4.

FIG. 8 depicts an algorithm including a set of steps the execution of which implements an embodiment of a process of determining the importance of the frames affected by data losses and their classification. This process consists in parsing a GOP and checking the status of each frame in the GOP. Alternatively, the process may consist in parsing a set of frames between two IDR frames and checking the status of each frame.

The number of frames using a considered frame as a reference is computed and taken into account. This number will provide a simple representation of the frame importance.

The process starts with the initialization of the variable FRAME_NUM to the minimum value taken by the FrameNum in the GOP (step 1901). In the SVC and H.264 standards, FrameNum represents the frame number in the decoding order. For the first frame of the first GOP of a sequence, FRAME_NUM takes the value 0. Otherwise, the first frame of a GOP is dealt with through a particular process. Indeed, since all the frames in the GOP depend on this particular frame, the importance of this frame is equal to the GOP size. As a consequence, no further computation is necessary and the next frame appearing in the frame number order may be tested. This next frame in the GOP takes a frame number equal to the frame number of the last frame in the previous GOP.

Step 1901 is followed by step 1903 where a check is made to determine whether the maximum temporal layer of the maximum dependency layer (MaxTId(MaxDId)) has been reached.

In the affirmative, the process comes to an end (step 1919).

Otherwise, the process continues by the initialization of the importance of the current frame I (FRAME_NUM) to the value 0 (step 1905).

Next, the variable frame_num is initialized to FRAME_NUM (step 1907).

During next step 1909, it is checked whether the current frame has been detected as lost by the detection/localization process (step 809 in FIG. 4).

In the negative, step 1921 is carried out where FRAME_NUM is incremented. Step 1903 is then repeated.

On the contrary, if the frame has been detected as lost, the variable frame_num is incremented by 1 (step 1911). A test is then carried out to determine whether the frame with a frame number equal to frame_num depends on the frame with the current frame number FRAME_NUM (step 1913). The dependency could be direct (i.e. the frame is predicted from the lost frame) or indirect (i.e. the frame is predicted from another frame depending on the lost frame).

If there is no dependency the process goes directly to step 1917 in order to check if all the frames in the GOP have been tested.

In the affirmative, the importance of the frame is incremented by 1 at step 1915.

If frames remain to be tested, the process returns to step 1911.

Otherwise, step 1917 is followed by step 1921 already described.

Thus, the importance of each of the lost frames in a GOP has been determined and the lost frames are then classified on a scale of importance according to the importance determined. The frames may be ranked on such a scale by a decreasing order of importance, for example.

Figure 9:
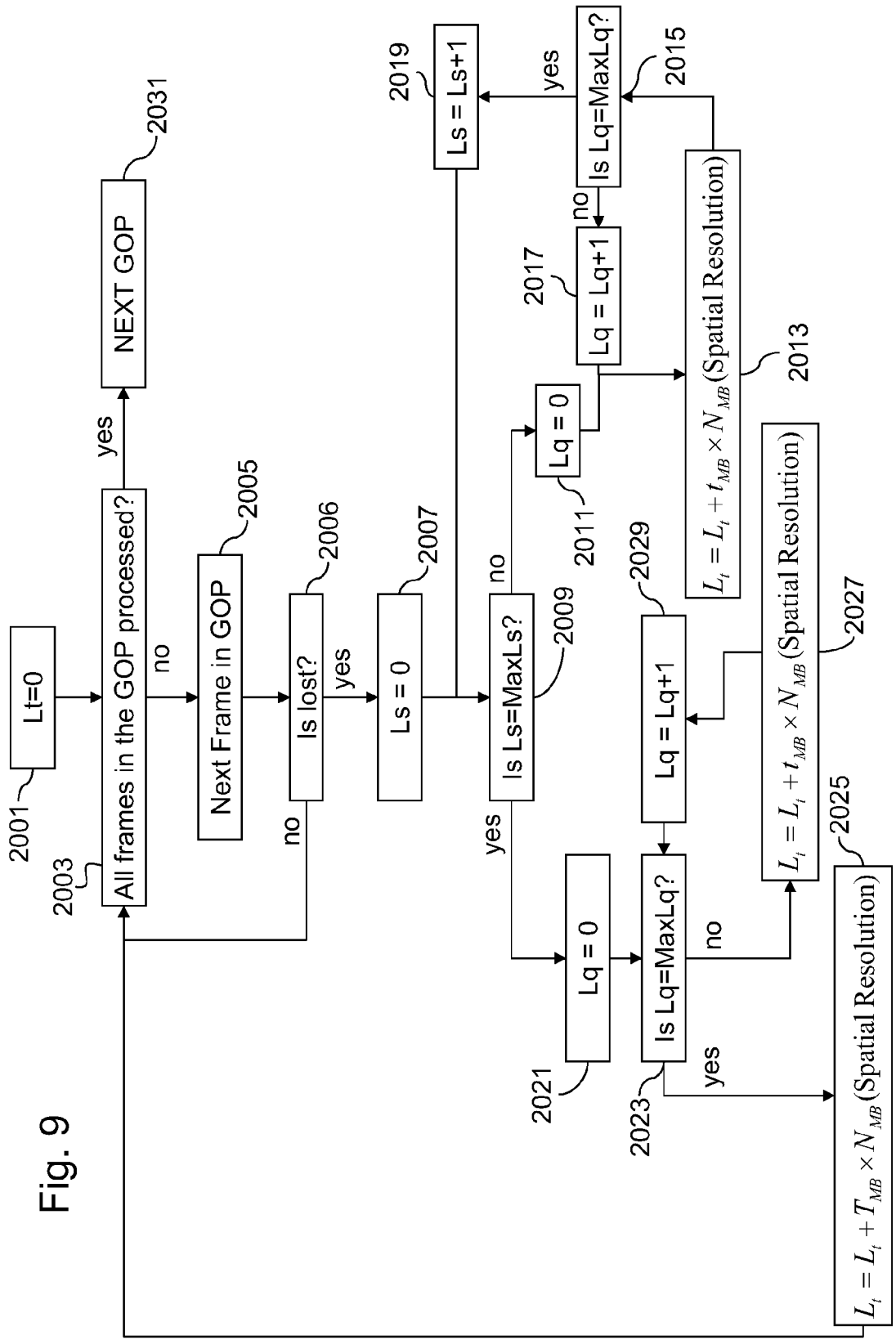
FIG. 9 is an algorithm detailing step 813 in FIG. 4.

FIG. 9 depicts an algorithm detailing step 813 in FIG. 4.

This algorithm includes a plurality of steps the execution of which enables determination of the time which will not be spent on the decoding of NAL units affected by data losses. This time should have been spent if the NAL units had been correctly received.

This time thus determined will therefore be available for carrying out other tasks.

In particular, this time will be allocated to reconstructing some or all, the NAL units affected by data losses.

The time to decode a frame is bounded by an upper time limit given by the frame rate F of the video sequence. Indeed, since the video sequence has to be decoded in real time, the decoder cannot spend more than 1/F seconds on the average to decode a frame.

However, since in the SVC standard, the frames may be decoded by GOP, the decoding time of a frame might vary between two frames, while keeping the mean decoding time in a GOP consistent with the frame rate. As a consequence, a more accurate determination of the freed decoding time may be performed. Indeed, it may take into account the type of the frame and its location in the GOP. The decoding time of a frame mainly depends on its type (I, P or B), the number of layers constituting the frame to display and the resolution of each layer.

The FIG. 9 algorithm aims to compute the time freed for processing a GOP.

This algorithm starts with the initialization to 0 of the variable Lt representing the freed time (step 2001).

A test is then made at step 2003 to check whether all the frames in the GOP have been dealt with.

In the affirmative, the analysis of the next GOP is performed (step 2031).

If not, the next frame (current frame) in the GOP is processed (step 2005). A test is next carried out at step 2006 to determine whether the current frame has been affected by data losses.

If not, the algorithm returns to step 2003.

In the affirmative, the variable Ls is initialized to 0 during next step 2007. This variable represents the current spatial layer.

This step is followed by step 2009 during which a test is made to check whether the current spatial layer is the topmost decoded spatial layer.

If not, step 2009 is followed by step 2011 where Lq is initialized to 0. Lq represents the current quality layer.

This step is followed by step 2013 in the course of which the variable Lt is incremented by the value $t_{MB} \times N_{MB}$ (Spatial Resolution), where $t_{MB}$ is the mean time necessary to partially decode a MB (macro block). Indeed, since this layer is not the topmost layer, it is decoded only to provide to the topmost layer the information necessary for the inter layer prediction. As a consequence, it is not necessary to generate an image in the intermediate layers but just to perform entropy decoding or arithmetic decoding.

In addition, as a first approximation, it is assumed that the time required to partially decode a MB is the same for all the quality layers.

Lastly, $t_{MB}$ depends on the MB type. However, as a first approximation, it is assumed that $t_{MB}$ will depend on the frame type only. $N_{MB}$ (Spatial Resolution) is the number of MBs (macroblocks) in the frame. It depends on the frame spatial resolution.

Thus, the freed time depends on the mean decoding time of a MB and the number of MBs.

Step 2013 is next followed by step 2015 where the value of Lq is compared with the maximum number of quality layers for this frame.

If Lq has not reached this number, Lq is incremented by 1 (step 2017) and step 2013 is executed once again.

Otherwise, step 2015 is followed by step 2019 during which Ls is incremented by 1. Step 2019 is next followed by step 2009.

Returning to test step 2009, if the current spatial layer is the topmost decoded spatial layer (Ls is equal to MaxLs), next step 2021 is carried out. During step 2021 Lq is initialized to 0.

This step is followed by step 2023, during which it is checked whether Lq has reached its maximum value.

In the affirmative, Lt is incremented by $T_{MB} \times N_{MB}$ (Spatial Resolution) during step 2025, where $T_{MB}$ is the mean time necessary to wholly decode a MB. Indeed, the process here applies to topmost spatial and quality layer that will be displayed and therefore this layer is to be wholly decoded. As for $t_{MB}$, $T_{MB}$ depends on the frame type.

Thus, the freed time $L_t$ depends on the mean decoding time of a MB and the number of MBs.

Step 2025 is followed by step 2003 already described.

If Lq has not attained its maximum value, step 2027 is performed.

During this step, the variable Lt is incremented in the same manner as described for step 2013 already described. Next step 2029 is carried out where Lq is incremented by 1.

It is to be noted that $t_{MB}$ and $T_{MB}$ are mean values which have been previously computed during the actual decoding of a set of training video sequences.

Thanks to the above described processes depicted in FIGS. 8 and 9, a set of NAL units and frames affected by data losses has been identified. Each NAL and each frame is classified on a scale of importance and a freed time has been estimated.

FIG. 10 illustrates an algorithm which details step 815 in FIG. 4. This algorithm includes a plurality of steps the execution of which enables selection of one or several reconstruction processes from a set of predetermined reconstruction processes.

For example, the FIG. 10 algorithm illustrates a method making it possible to select the best concealment process for each frame based on its classification on the scale of importance. It is assumed here that several concealment processes are available on the client side and that these processes differ according to the technology employed, their complexity and the error concealment quality they provide. Generally speaking, two families of error concealment processes are defined:

spatial error concealment temporal error concealment

In the case of scalable video coding a third family constituted of inter layer error concealment processes may be added.

These processes consist in using a lower scalable layer to perform concealment for a higher scalable layer affected by data losses.

In the embodiment described, it is considered that a frame that has suffered data losses, has been completely lost. This choice is only made to simplify the description and is not to be understood as reducing the scope of the invention.

It is to be noted that if some NAL units are received for an AU, these NAL units can contribute to the improvement of the concealment process.

Spatial error concealment processes and inter layer concealment process are not adapted to the present embodiment where an AU affected by a data loss is always rejected in entirety.

Therefore, only temporal error concealment processes will be considered in this embodiment.

Temporal error concealment consists in using temporal correlation between frames in order to conceal a data loss.

A simple temporal error concealment process consists in duplicating the closest decoded frame in place of the lost frame. This process is suitable for static video sequences but does not provide good results in case of motion. However, this process is advantageous in terms of reduced calculation and/or memory costs since it consists only in a copy of a frame in a memory. In the following, this method will be referred to as "COPY_EC" for error concealment by copy. The process is also referenced as process 1.

A second type of process consists in propagating the motion of one frame to the lost frame.

It is assumed here that the motion is continuous, and the motion which is applied to the collocated MBs in the closest decoded frame is also applied to the MBs of the lost frame. This process will be referred to as "EXTRAPOLATION_EC" in the following. The process is also referenced as process 2.

The assumption that the motion is continuous is not always verified. It may therefore be better to interpolate the motion between two decoded frames instead of trying to propagate the motion of one frame to another one. According to this process, the motion of a MB in the lost frame is the averaged motion of the motions of the two collocated MBs in the closest previous and following decoded frames. This could be a weighted average depending on the distance between the lost frame and the two frames used for the concealment. This process will be referred to as "INTERPOLATION_EC" in the following. The process is also referenced as process 3.

In table 1, reproduced below, each error concealment process has been allocated a quality indicator (Q1, Q2, Q3).

The quality indicator increases with the expected performance of the error concealment process. Since the quality of the error concealment depends on the motion characteristics, the performance of the error concealment is given as a function of an estimation of the motion characteristics.

TABLE 1

Quality indicator for each error concealment process as a function of the motion characteristics

| | Static sequence or slow motion | Continuous motion | Discontinuous motion |
|---|---|---|---|
| COPY_EC (Q1) | 1 | 1 | 1 |
| EXTRAPOLATION_EC (Q2) | 1 | 2 | 2 |
| INTERPOLATION_EC (Q3) | 1 | 2 | 3 |

It can be noticed that the time spent to perform the error concealment is a function of the frame resolution. Thus, this time will be expressed as a function of the time necessary for decoding the topmost layer:

$$T_{C\_EC} = \Delta_{C\_EC} \times T_{MB} \times N_{MB}(\text{Spatial Resolution})$$

$$T_{E\_EC} = \Delta_{E\_EC} \times T_{MB} \times N_{MB}(\text{Spatial Resolution})$$

$$T_{I\_EC} = \Delta_{I\_EC} \times T_{MB} \times N_{MB}(\text{Spatial Resolution})$$

$\Delta_{C\_EC}$ is an average multiplicative factor estimated by applying the COPY_EC process on a set of frames in a set of training video sequences and by dividing the time spent to apply the error concealment process by the time spent to decode the same frame. A typical value of $\Delta_{C\_EC}$ is between 0 and 1.

$\Delta_{E\_EC}$ is an average multiplicative factor estimated by applying the EXTRAPOLATION_EC process to a set of frames in a set of training video sequences and by dividing the time spent to apply the error concealment process by the time spent to decode the same frame. A typical value of $\Delta_{E\_EC}$ is higher than $\Delta_{C\_EC}$.

$\Delta_{I\_EC}$ is an average multiplicative factor estimated by applying the INTERPOLATION_EC process to a set of frames in a set of training video sequences and by dividing the time spent to apply the error concealment process by the time spent to decode the same frame. A typical value of $\Delta_{I\_EC}$ is higher than $\Delta_{E\_EC}$.

It is to be noted that the time spent to apply an error concealment process to a frame may be higher than the time necessary to decode it. Therefore $\Delta_{X\_EC}$ may be higher than 1.

The method for selecting an error concealment process requires the evaluation of the type of motion occurring in the frames. The speed of motion can be evaluated by computation based on the cumulative norm $C_{MV}$ of the motion vectors of all the MBs in the frame preceding the frame to which concealment will be applied as follows:

$$C_{MV} = \sum_{n=0}^{N-1} (X_n^2 + Y_n^2)$$

In this expression, N is the number of MBs in a frame and $X_n$ and $Y_n$ are the coordinates of the motion vector of MB n in the frame.

This cumulative norm is compared to a threshold $TH_{MV}$ depending on the frame size. If $C_{MV} \leq TH_{MV}$, the motion is considered as slow. Otherwise, the motion is considered as high. The threshold $TH_{MV}$ is estimated from trials performed on training video sequences.

The regularity of the motion r is computed from the two closest frames and expresses as follows:

$$r = \sum_{n=0}^{N-1} (X_n^1 - X_n^2)^2 + (Y_n^1 - Y_n^2)^2$$

where $(X_n^1, Y_n^1)$ are the coordinates of the motion vector of the MB n in the first closest frame (a previous or future frame which is temporally the closest to the considered frame to which concealment is to be applied), and $(X_n^2, Y_n^2)$ are the coordinates of the motion vector of the MB n in the second closest frame (a frame that is different from the first closest frame which is temporally closest to the considered frame to which concealment is to be applied).

If r<R, where R is a threshold computed from training video sequences and which is a function of the frame resolution, the motion is considered as regular. Otherwise, the motion is considered as not regular.

The method of selecting a concealment process starts in FIG. 10 with step 2100 where the variable Tr is initialized to the value of the freed time Lt determined as described above. In the course of execution of step 2101, a test is carried out to check whether all the erroneous frames detected during step 809 in FIG. 4 have been processed.

In the affirmative, the next GOP will be dealt with (step 2119). If not, the next frame is processed. The frames are managed according to the importance order given by the classification performed during step 811 in FIG. 4.

During step 2105 and 2107 the norm $C_{MV}$ and motion regularity r are respectively computed and compared to the respective thresholds $TH_{MV}$ and R. If the motion is low, the quality indicators Q1, Q2 and Q3 take their values mentioned in the first column of table 1.

If the motion is high but continuous, Q1, Q2 and Q3 take their values mentioned in the second column. Finally, if the motion is high and not continuous, Q1, Q2 and Q3 take their respective values mentioned in the third column.

During next step 2109 i and Qi are initialized to 0, i being a variable used to test all the concealment processes.

Next step 2111 is carried out and i is incremented by 1.

A test step 2113 is then performed. If Qi>Qi−1, this step is followed by step 2114. During this step $Tr^{X\_EC}$ is set to a value Tr−$T_{X\_EC}$, where $T_{X\_EC}$ corresponds to the time that is necessary to perform the corresponding error concealment process. This time $T_{X\_EC}$ is then subtracted from the freed or remaining time Tr defined at step 2100 to obtain the value Tr−$T_{X\_EC}$.

During next step 2115, it is checked whether $Tr^{X\_EC}$ is higher than 0.

If not, the next GOP will be processed (step 2119).

Otherwise, if Tr is higher than 0 the concealment process i is selected for this frame (step 2116). If any process remains to be tested, test step 2117 is followed by step 2111. Otherwise, step 2120 is carried out where Tr takes the value $Tr^{X\_EC}$.

Next, the algorithm returns to step 2101 already described for processing another frame.

It is to be noted that the best concealment process selected after implementing the method of FIG. 10 may not necessarily provide sufficient quality.

As already mentioned above in connection with step 816 in FIG. 4 the quality provided by the reconstruction process selected at step 815 and detailed in FIG. 10 may be compared to a quality threshold.

If the quality obtained for this process is inferior to the threshold, it may be decided to try to request the retransmission of the packets corresponding to the erroneous frame. This decision may be taken on the basis of a predetermined criterion.

Assuming that the client has an estimation of the round trip time (RTT), this RTT is compared to the remaining time Tr.

If RTT<Tr, then the client requests the retransmission of the frame. Tr is next decreased by the time elapsed between the emission of the retransmission request and the reception of the requested frame.

When the requested frame is received, the FIG. 10 algorithm is executed again.

As a variant embodiment, the decision of sending a request for retransmission may be taken as a function of the time available estimated at step 813 in FIG. 4.

According to another variant embodiment, this decision may be taken for the first frames in the GOP concerned.

As described above with reference to FIG. 10, this method has been applied to erroneous frames only. However, it may also be applied to all the frames, lost, i.e. affected by data losses and valid, i.e. correctly received. In that case, during step 2100, Tr is set to a value representing a predetermined time that is necessary to decode the whole GOP. The GOP includes valid and lost frames. Normally, valid frames are conventionally decoded and lost frames are reconstructed by a concealment process. All the frames are supposed here to be classified according to an order of importance. Valid frames are decoded and lost frames are error concealed or retransmitted, the decoding process being carried out taking into account the time determined and allocated to error concealing or retransmitting the lost frames. For valid frames, step 2101 is followed by step 2114, where $T_{X\_EC}$ is replaced by the time that is necessary to decode the considered frame. As a consequence, some valid frames may not be decoded, if a complex error concealment process (reconstruction process) requiring a long processing time is applied to an important lost frame. This decision of not decoding some valid frames is taken when the processing time exceeds the above determined freed time.

Thus, the predetermined time necessary to decode the whole GOP is shared between a time devoted to decoding valid frames and a time that is necessary for reconstructing lost frames. The time necessary for reconstructing lost frames may be greater than the determined freed time for these lost frames as explained above, which requires more time for reconstructing important lost frames and less time for decoding valid frame.

All the frames processed by this method are marked as decoded.

If the method is applied only to lost frames, valid frames are marked as decoded by default.

If all the frames are processed, all the frames are marked as not decoded by default at the beginning of the method.

The decoding and concealment processes depicted by steps 820 and 821 in FIG. 4 are applied only to frames marked as decoded. Other frames are neither decoded nor concealed.

The invention claimed is:

1. A method of reconstructing a sequence of video data in a receiving device after the video sequence has been transmitted in encoded form over a network, the encoded video sequence comprising containers of encoded video data, wherein the method includes:
   determining containers of encoded video data affected by data losses during their transmission over the network,
   determining the time that would be necessary for decoding said containers of encoded video data affected by data losses if they had not been affected by data losses,
   allocating the time thus determined to reconstructing video data of the sequence,
   wherein the video sequence comprises a plurality of frames, each container of encoded video data including at least one portion of a frame that is divided into blocks of data, called macroblocks, the time determined depending on a mean time for decoding a macroblock and the number of macroblocks contained in the at least one portion of frame.

2. A method according to claim 1, wherein it includes a step of selecting, according to the time determined, one or several reconstruction processes from a set of predetermined reconstruction processes comprising a plurality of error concealment processes and the retransmission of at least some of the video data affected by data losses.

3. A method according to claim 2, wherein the selection of one or several reconstruction processes is made according to an importance determined for the containers of encoded video data affected by data losses.

4. A method according to claim 2, wherein each reconstruction process is defined both by a quality indicator representing the quality of reconstruction associated therewith and by an estimated implementation time needed therefor.

5. A method according to claim 4, wherein the selection of one or several reconstruction processes is made according to the quality indicator and the estimated implementation time associated with each reconstruction process.

6. A method according to claim 1, wherein the method further includes a step of determining the importance of the containers of encoded video data affected by data losses in terms of impact on the quality of reconstruction of the sequence of video data without these containers.

7. A method according to claim 6, wherein the method further includes a step of classifying the containers of encoded video data affected by data losses according to their importance thus determined 8. A method according to claim 1, wherein the video sequence comprises a plurality of scalability layers, the mean decoding time of a macroblock depending on the scalability layer of the corresponding container of encoded video data.

9. A method according to claim 8, wherein the mean decoding time of a macroblock depends on the fact that the macroblock is in a scalability layer that is partially decoded or not.

10. A method according to claim 1, wherein the video sequence comprising a plurality of frames, among the containers of encoded video data corresponding to a set of encoded frames and that are transmitted over the network at least one of the containers is affected by data losses and the others are correctly received, the method including a step of decoding containers of encoded video data that are correctly received and a step of reconstructing the video data of the at least one container affected by data losses, the step of decoding being carried out taking into account the time determined and allocated to reconstructing said video data.

11. A method according to claim 10, wherein a predetermined decoding time is necessary for decoding all the containers of encoded video data corresponding to a set of encoded frames, said decoding time being shared between a time devoted to decoding containers that are correctly received and a time that is necessary for reconstructing video data affected by data losses.

12. A method according to claim 11, wherein one or several containers of encoded video data correctly received are not decoded if the time that is necessary for reconstructing video data affected by data losses exceeds the time determined and allocated to reconstructing said video data.

13. A method of reconstructing a sequence of video data in a receiving device after the video sequence has been transmitted in encoded form over a network, the encoded video sequence comprising containers of encoded video data, the method including a reconstruction process comprising applying an error concealment method to at least some of the containers of encoded video data affected by data loss and/or decoding the correctly received containers of encoded video data, the method including:
   determining containers of encoded video data affected by data loss during their transmission over the network,
   determining the time necessary for decoding said containers of encoded video data affected by data loss if they had not been affected by data loss,
   scheduling the reconstruction process according to said determined time,
   wherein the video sequence comprises a plurality of frames, each container of encoded video data including at least one portion of a frame that is divided into blocks of data, called macroblocks, the time determined depending on a mean time for decoding a macroblock and the number of macroblocks contained in the at least one portion of frame.

14. A method of reconstructing a sequence of video data in a receiving device after the video sequence has been transmitted in encoded form over a network, the encoded video sequence comprising containers of encoded video data, wherein the method includes:
   determining containers of encoded video data affected by data loss during their transmission over the network,
   determining the time that would be necessary for decoding said containers of encoded video data affected by data loss if they had not been affected by data loss,
   allocating the time thus determined to applying an error concealment method to at least the containers of video data affected by data loss and/or decoding at least some of the containers of encoded video data not affected by data loss,
   wherein the video sequence comprises a plurality of frames, each container of encoded video data including at least one portion of a frame that is divided into blocks of data, called macroblocks, the time determined depending on a mean time for decoding a macroblock and the number of macroblocks contained in the at least one portion of frame.

15. A device for reconstructing a received sequence of video data after the video sequence has been transmitted in encoded form over a network, the encoded video sequence comprising containers of encoded video data, wherein the device includes:
   a processor configured to:
   determine containers of encoded video data affected by data losses during their transmission over the network, determine the time that would be necessary for decoding said containers of encoded video data affected by data losses if they had not been affected by data losses, allocate the time thus determined to reconstructing video data of the sequence, wherein the video sequence comprises a plurality of frames, each container of encoded video data including at least one portion of a frame that is divided into blocks of data, called macroblocks, the time determined depending on a mean time for decoding a macroblock and the number of macroblocks contained in the at least one portion of frame.

16. A non-transitory computer-readable memory having stored thereon one or more sequences of instructions for causing one or more processors to execute the steps of the method according to claim 1, 13 or 14.

* * * * *